Patented Mar. 26, 1940

2,195,165

UNITED STATES PATENT OFFICE 2,195,165

METHOD OF COOKING RICE

Arthur R. Choppin, Baton Rouge, La., and Eleanor L. Winborn, Lumberton, Miss., assignors to The Rice Millers' Association, New Orleans, La.

No Drawing. Application June 7, 1939, Serial No. 277,910

5 Claims. (Cl. 53—21)

Our invention relates to improvements in methods of cooking rice and the like.

The invention is directed primarily toward providing a method of cooking rice so as to hydrolyze the starch therein uniformly throughout the rice grains and prevent excessive hydrolysis and the consequent rupture of the external cells of the grains.

Another object is to provide for cooking rice either thoroughly or partially, as desired, without causing the grains to burst open and lose their shape.

Other and subordinate objects are also comprehended by our invention, all of which, together with the precise steps of the method, will become readily apparent from the succeeding description and claims.

Describing now our invention in detail, in the practice of our improved method the hulled rice, first thoroughly cleaned, as by washing, is transported at a uniform rate of speed in a spread-out mass condition in a substantially steam-tight chamber over a body of water heated to generate steam at, or above, a temperature of 100° C. to the action of which the rice is exposed. The pressure of the steam in the chamber may be equal to, less than, or greater than 1 atmosphere (760 mm.) according to operating requirements. During exposure of the rice to such steam, limited quantities of liquid water are added slowly to the rice preferably from above the same, either intermittently, or continuously, and preferably by spraying the same thereon, although as alternative procedure, the rice may be submerged in water for short intervals, or the steam caused to condense in a cloud of mist and to be precipitated in this form on the surface of the rice. The period of time that the rice is exposed to such steam, also the quantity and timing of the addition of water may be varied, as occasion may require, for instance, depending on whether the rice is to be cooked partially or completely.

By the described simultaneous exposure to steam and slow addition of water, while the rice is being transported at a uniformly slow rate of speed through the steam, the grains may be uniformly cooked partially, or thoroughly, as desired and the cooking carried out in such a way as to hydrolyze the starch uniformly throughout the grains and prevent excessive hydrolysis and cell rupture of the grains. Thus the rice retains its shape and the final product possesses the desired qualities of rice thoroughly, or partially cooked, as the case may be.

The foregoing will, it is believed, suffice to impart a clear understanding of our invention without further explanation.

Manifestly, the invention, as described, is susceptible of modification without departing from the inventive concept and right is herein reserved to such modifications as fall within the scope of the subjoined claims.

What is claimed is:

1. The herein described method of cooking rice and similar grain comprising subjecting the same to the action of steam under pressure and at a temperature of at least 100° C. and adding water in measured quantities to the rice while subjected to action of the steam.

2. The herein described method of cooking rice and similar grain comprising feeding the same in a spread-out mass condition through steam under pressure and at a temperature of at least 100° C. and spraying water on said mass at regular intervals while subjected to the action of such steam.

3. The herein described method of cooking rice and similar grain comprising feeding the rice in a spread-out mass condition through steam under pressure equal to 760 mm. and at a temperature of at least 100° C. and intermittently spraying water on said mass while subjected to the action of such steam.

4. The herein described method of cooking rice and similar grain comprising feeding the rice in a spread-out mass of uniform thickness through steam under pressure equal substantially to 760 mm. and a temperature of at least 100° C. and causing said steam to be precipitated in the form of mist on said mass.

5. The herein described method of cooking rice and similar grain comprising feeding the rice in a spread-out mass condition and at a uniform speed through steam under pressure equal to substantially 760 mm. and at a temperature of substantially 100° C. and condensing the steam on said mass.

ARTHUR R. CHOPPIN.
ELEANOR L. WINBORN.